(12) United States Patent
Kuwana et al.

(10) Patent No.: US 7,359,867 B2
(45) Date of Patent: Apr. 15, 2008

(54) COMPUTER SYSTEM, SERVER, AND METHOD FOR SUPPORTING COOKING, AND COMPUTER PROGRAM GENERATOR

(75) Inventors: Kenji Kuwana, Chiba (JP); Yukiko Inada, Tokyo (JP); Takahisa Hanajima, Tokyo (JP); Makoto Nakanishi, Tokyo (JP); Fumikazu Wakaki, Tokyo (JP); Yumi Watanabe, Tokyo (JP)

(73) Assignees: Ricoh Company, Ltd., Tokyo (JP); Ricoh Technosystems Co., Ltd., Tokyo (JP)

( * ) Notice: Subject to any disclaimer, the term of this patent is extended or adjusted under 35 U.S.C. 154(b) by 692 days.

(21) Appl. No.: 10/106,023

(22) Filed: Mar. 27, 2002

(65) Prior Publication Data

US 2002/0143658 A1  Oct. 3, 2002

(30) Foreign Application Priority Data

Mar. 27, 2001 (JP) ............................. 2001-091161
Mar. 29, 2001 (JP) ............................. 2001-094896

(51) Int. Cl.
*G06Q 30/00* (2006.01)
(52) U.S. Cl. ......................................... 705/15; 705/26
(58) Field of Classification Search .................. 705/26, 705/27, 15, 16, 21, 22, 24
See application file for complete search history.

(56) References Cited

U.S. PATENT DOCUMENTS 5,845,263 A * 12/1998 Camaisa et al. ............... 705/27
6,801,228 B2 * 10/2004 Kargman ....................... 705/26
2002/0013734 A1 * 1/2002 Bueno ........................... 705/26
2002/0062266 A1 * 5/2002 Aoki ............................. 705/27
2002/0103751 A1 * 8/2002 Tanaka ......................... 705/27
2002/0133418 A1 * 9/2002 Hammond et al. ........... 705/26

FOREIGN PATENT DOCUMENTS

| JP | 09-274629 | 10/1997 |
| JP | 10-177598 | 6/1998 |
| JP | 11-031175 | 2/1999 |

OTHER PUBLICATIONS

Japanese Office Action, dated Apr. 22, 2003, directed to corresponding Japanese Application No. 2001-094896.
Nakajima, T. "Learn from Successful Internet Sites: Sales of One Hundreds Million Yen at Expense of Few Hundreds Thousands Yen; Use Manpower and ASP Aggresively," Nikkei Internet Technology. Feb. 22, 2001:119-127.

* cited by examiner

*Primary Examiner*—Gerald J. O'Connor
(74) *Attorney, Agent, or Firm*—Morrison & Foerster LLP (57) ABSTRACT

An information providing unit of a server reads a menu table in accordance with a request sent from a customer terminal. The customer terminal presents menu items together with their nutritive values to a customer in accordance with data sent from the server. A selection process unit of the server specifies a dish to be ordered from a cooking service provider in accordance with an instruction sent from the customer terminal. An order process unit of the server searches a cooking material database in order to specify a cooking material necessary for making the dish. A monetary matter process unit of the server performs a process for collecting a charge for the provided service from the cooking service provider or from a cooking material provider.

6 Claims, 8 Drawing Sheets

NAME OF COOKING MATERIAL — 20

| COOKING MATERIAL PROVIDER | COOKING MATERIAL PROVIDER | ... |
|---|---|---|
| PRICE | PRICE | |
| COOKING MATERIAL PROVIDER | COOKING MATERIAL PROVIDER | ... |
| PRICE | PRICE | |

| CUSTOMER'S NAME |
| CUSTOMER ID |
| PASSWORD |
| CONTACT ADDRESS |
| RESIDENCE ADDRESS |
| PHYSICAL INFORMATION |

COMPUTER SYSTEM, SERVER, AND METHOD FOR SUPPORTING COOKING, AND COMPUTER PROGRAM GENERATOR

BACKGROUND OF THE INVENTION

1. Field of the Invention

The present invention relates to a computer system for supporting cooking or preparing foods.

2. Description of the Related Art

Computer systems for supporting cooking by electronically planning a menu for one meal or by accepting orders for cooking materials on-line have been proposed.

For example, Unexamined Japanese Patent Application KOKAI Publication No. H10-177598 discloses a menu planning system. This system visualizes serving states of dishes included in a menu, to help plan a menu. In addition, this system can automatically calculate nutritive values and material costs of dishes based on the serving states of dishes, and display the calculation results.

As another example, Unexamined Japanese Patent Application KOKAI Publication No. H9-274629 discloses a material order system. In this system, when ordering materials for a dish via a computer network, users can add, cancel, or increase or decrease numbers of materials.

Cooking service providers such as box lunch venders, pizza delivery service providers, etc. make dishes at the request of customers. Usually, cooking service providers prepare a menu which lists dishes, and provide it to customers. Customers select dishes of their tastes from the menu, and order the selected dishes from the cooking service providers.

If cooking service providers make changes in the menu in accordance with tastes of customers, it becomes harder to efficiently procure materials used in dishes included in the menu which has been changed. And it is demanded to realize an integrated system in which cooking service providers, who have received orders for dishes, can instantaneously make orders for necessary cooking materials to cooking material providers.

SUMMARY OF THE INVENTION

It is an object of the present invention to provide an integrated computer system for supporting cooking foods. To accomplish this object, a computer system for supporting cooking according to a first aspect of the present invention comprises a number of elements in combination. The combination may include a providing unit that provides multiple menu items to a customer; a selection unit that selects, from the menu items provided by the providing unit a menu item to order; and an order process unit that orders the menu item selected by the selection unit. The order process unit specifies at least one cooking material to be used in the menu item and orders the specified cooking material from a cooking material provider.

In a preferred embodiment the providing unit provides menu items which have been planned by each cooking service provider the cooking material provider. In a preferred embodiment the selection unit may be set so that a menu for one meal which is different from a menu for one meal which has been set by each cooking service provider the cooking material provider can be selected.

In a preferred embodiment the providing unit may present a price and a nutritive value for each menu item. In a preferred embodiment a monetary matter process unit may collect a service charge for ordering the menu item.

In another preferred embodiment a server is provided for supporting cooking. The server includes a number of elements in combination. The combination includes a providing unit which performs data communication with a customer terminal in order to provide a customer with a plurality of menu items. A selection unit selects a menu item to order in accordance with an instruction sent from the customer terminal. An order process unit performs data communication with a first service provider's terminal used by a cooking service provider to order the menu item selected by the selection unit. The order process unit specifies at least one cooking material to be used in the menu itein selected by the selection unit and performs data communication with a second service provider's terminal used by a cooking material provider in order to order the specified cooking material.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
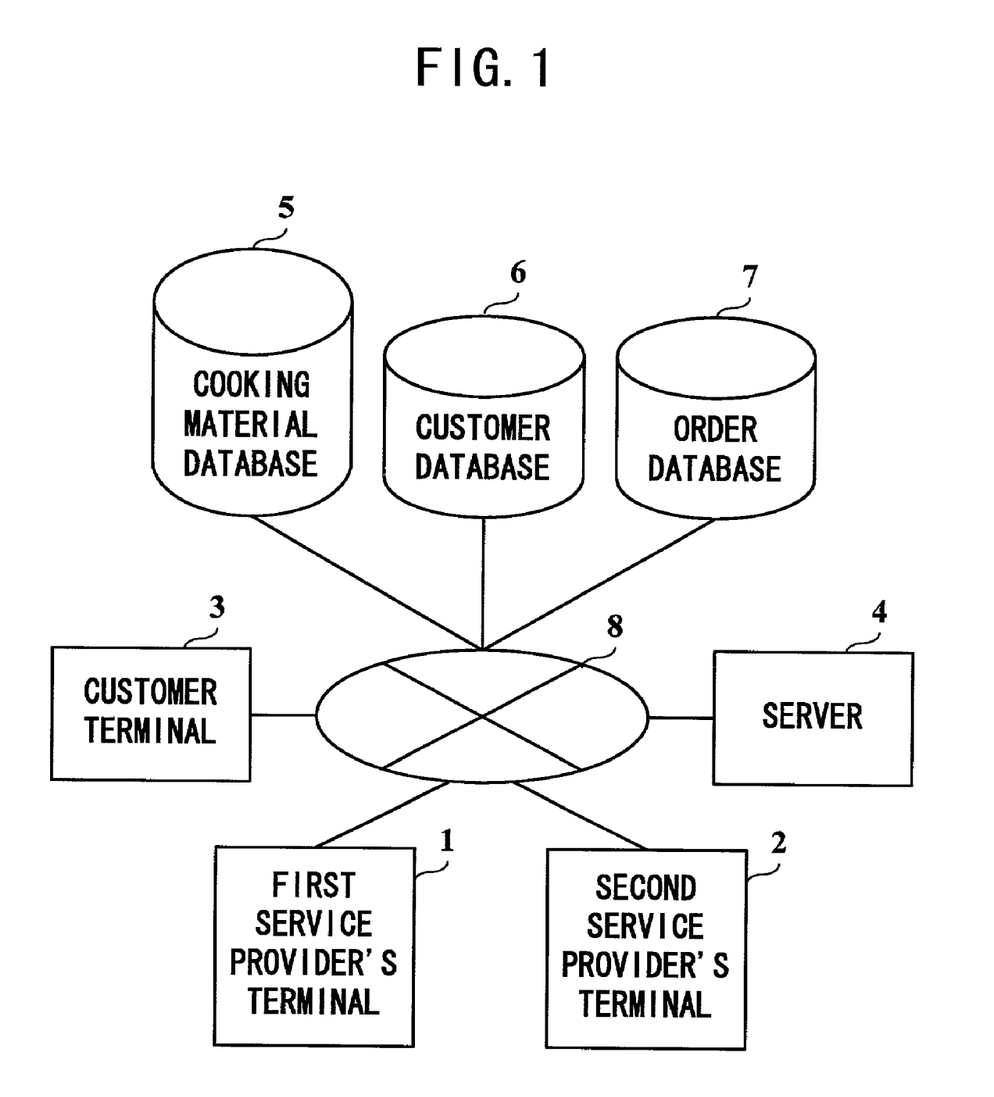
FIG. 1 is a diagram showing a computer system according to an embodiment of the present invention.

An embodiment of the present invention will now be explained with reference to the drawings. FIG. 1 is a block diagram showing an example of a computer system according to this embodiment.

As shown in FIG. 1, this computer system comprises a first service provider's terminal 1, a second service provider's terminal 2, a customer terminal 3, a server 4, a cooking material database 5, a customer database 6, an order database 7, and a network 8.

Each of the first service provider's terminal 1, the second service provider's terminal 2, and the customer terminal 3 is a computer comprising a user interface (for example, a keyboard, a display device, a mouse, etc.), a microprocessor, a storage device (for example, a RAM, a ROM, a HDD, or the like), a network interface, and the like.

The first service provider's terminal 1 is used by a cooking service provider. The first service provider's terminal 1 may be replaced by a plurality of terminals which are provided to a plurality of cooking service providers respectively. The second service provider's terminal 2 is used by a cooking material provider. The second service provider's terminal 2 may be replaced by a plurality of terminals which are provided to a plurality of cooking material providers respectively. The customer terminal 3 is used by a customer of a cooking service provider, or by a customer of a cooking material provider. The customer terminal 3 may be replaced by a plurality of terminals which are provided to a plurality of customers respectively.

The first service provider's terminal 1, the second service provider's terminal 2, and the customer terminal 3 output information supplied from the server 4, and input an instruction directed to the server 4. The first service provider's terminal 1, the second service provider's terminal 2, and the customer terminal 3 comprise browsers for performing data communication with the server 4, for example.

Figure 2:
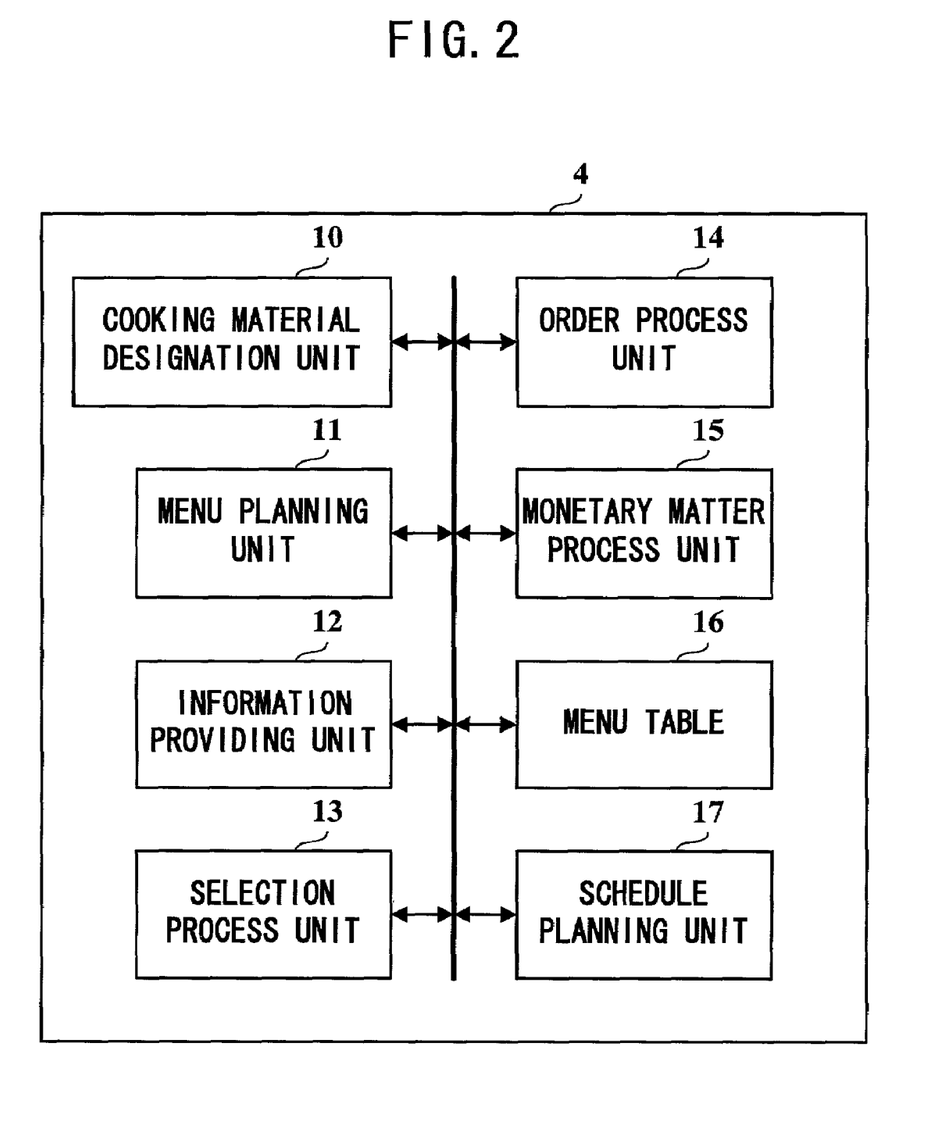
FIG. 2 is a diagram showing a structure of a server.

The server 4 is a computer comprising a CPU (Central Processing Unit), a storage device (such as a RAM, a ROM, a HDD, or the like), and a network interface. FIG. 2 is a diagram showing the structure of the server 4. The server 4 comprises a cooking material designation unit 10, a menu planning unit 11, an information providing unit 12, a selection process unit 13, an order process unit 14, a monetary matter process unit 15, a menu table 16, and a schedule planning unit 17. For example, the CPU of the server 4 realizes and controls this structure by executing a program stored in the storage device (a RAM, a ROM, a HDD, or the like). The server 4 provides a Web page to the first service provider's terminal 1, the second service provider's terminal 2, and the customer terminal 3, in order to readily receive various instructions from those terminals.

The cooking material designation unit 10 designates a material to be used in a dish in accordance with an instruction from the first service provider's terminal 1 or from the customer terminal 3. The material to be designated by the cooking material designation unit 10 is reserved at the instruction sender's place (where the first service provider's terminal 1 or the customer terminal 3 is installed).

The menu planning unit 11 plans a menu for one meal which uses a material designated by the cooking material designation unit 10, by referring to the cooking material database 5 and the menu table 16. The technique disclosed in Unexamined Japanese Patent Application KOKAI Publication No. H10-177598 may be applied to the menu planning unit 11. The menu planning unit 11 may plan a plurality of menus which satisfy a condition prescribed by the cooking material designation unit 10.

The information providing unit 12 sends information representing a menu planned by the menu planning unit 11 to the first service provider's terminal 1 and the customer terminal 3. In addition, the information providing unit 12 sends cooking material data 20 which is stored in the cooking material database 5 to the customer terminal 3.

The selection process unit 13 selects a menu planned by the menu planning unit 11 in accordance with an instruction from the first service provider's terminal 1 or the customer terminal 3. In addition, the selection process unit 13 selects a cooking material provider to whom an order for a cooking material is made in accordance with an instruction from the first service provider's terminal 1 or the customer terminal 3.

The order process unit 14 performs various processes relating to an order for a dish and an order for a material necessary for the dish. For example, the order process unit 14 performs data communication with the second service provider's terminal 2 in order to make orders for lacking materials necessary for a dish selected by the selection process unit 13. The order process unit 14 stores data representing an ordered dish or an ordered cooking material in the order database 7.

The monetary matter process unit 15 performs a process for electronically receiving a charge for a service provided by the server 4, and a process for paying a reward to a customer.

The menu table 16 represents all menu items served by a cooking service provider equipped with the first service provider's terminal 1. Further, the menu table 16 records data representing a nutritive value for each menu item. The menu table 16 may have a hierarchical structure including an area for a menu for one meal made up of a plurality of dishes, and an area for each single dish. The menu table 16 may be prepared for each of a plurality of cooking service providers. That is, the menu table 16 may be replaced by a plurality of tables each representing menu items planned by each cooking service provider.

The schedule planning unit 17 plans a dietary schedule based on information stored in the customer database 6, and information input by the customer terminal 3.

Figure 3:
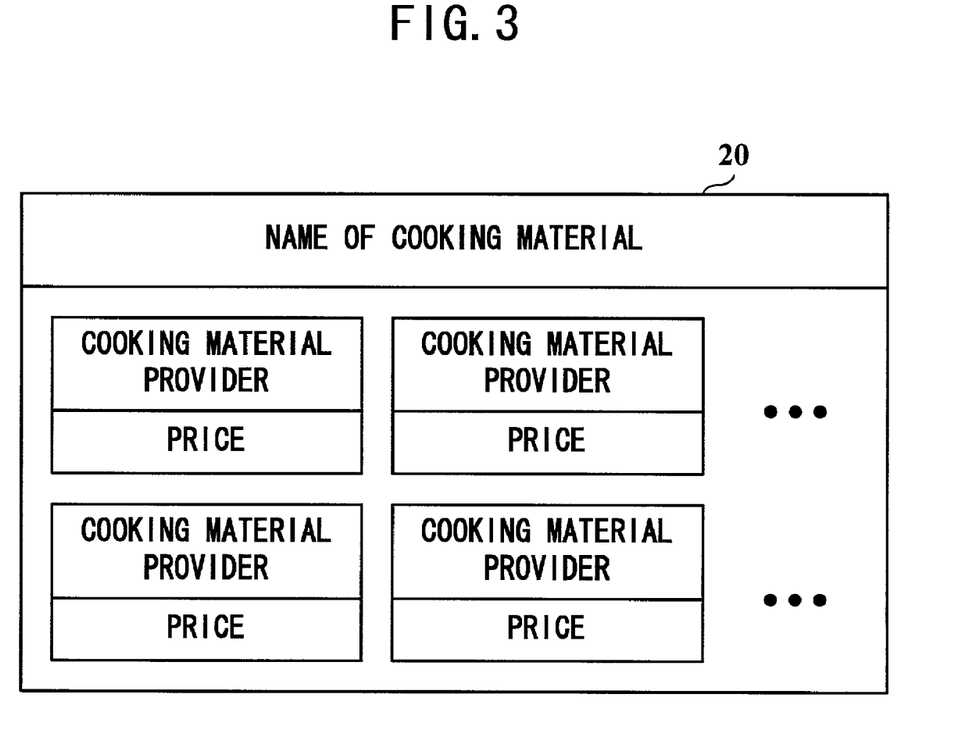
FIG. 3 is a diagram showing one example of cooking material data.

The cooking material database 5 shown in FIG. 1 stores the cooking material data 20. The cooking material data 20 represents prices for each cooking material used in a dish, set by a plurality of cooking material providers. FIG. 3 shows one example of the cooking material data 20. The cooking material data 20 shown in FIG. 3 is made up of several data representing a name of a material, a cooking material provider, and a price. The cooking material data 20 is associated with information representing a menu item stored in the menu table 16. The cooking material data 20 is set so that each material necessary for making a dish, and a required quantity for each material, and a price for each material can be specified in accordance with a menu for one meal or a single dish selected by the selection process unit 13. The cooking material database 5 may be set in the first service provider's terminal 1 or in the server 4.

Figure 4:
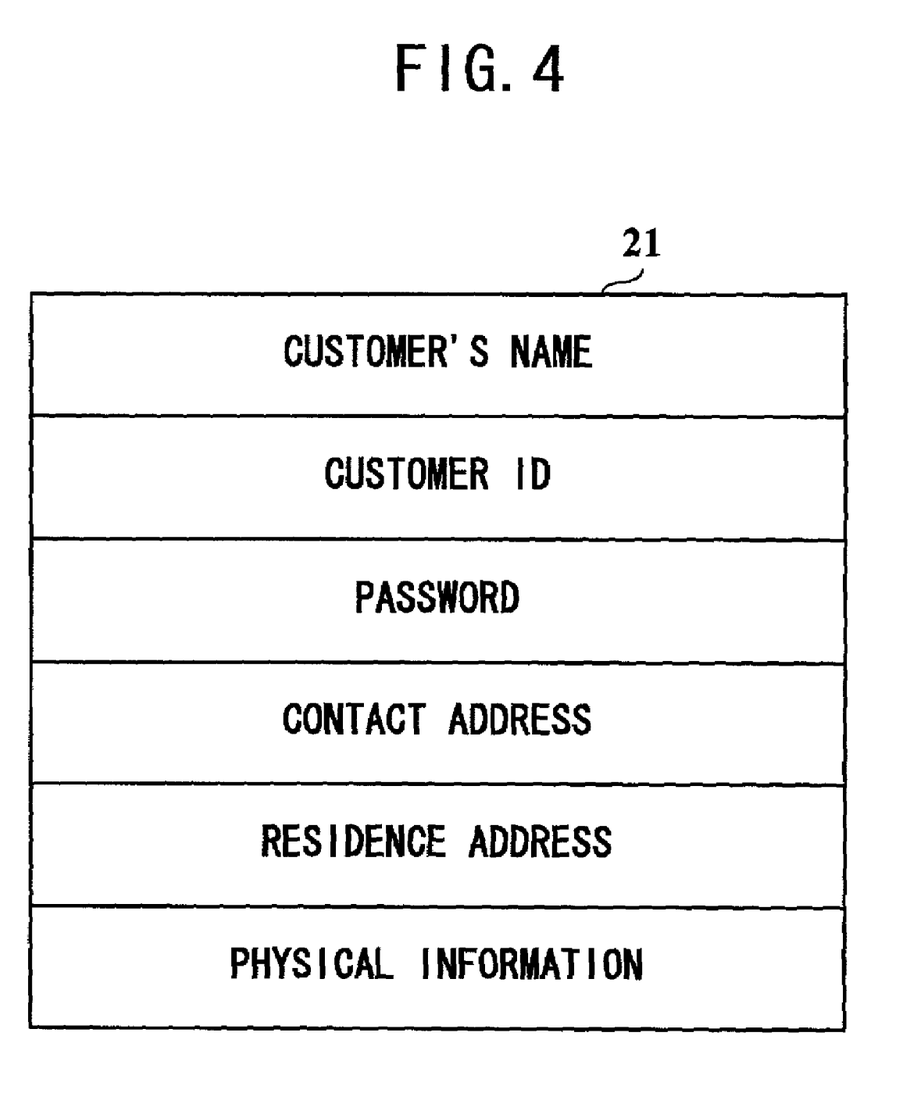
FIG. 4 is a diagram showing one example of customer data.
Figure 6:
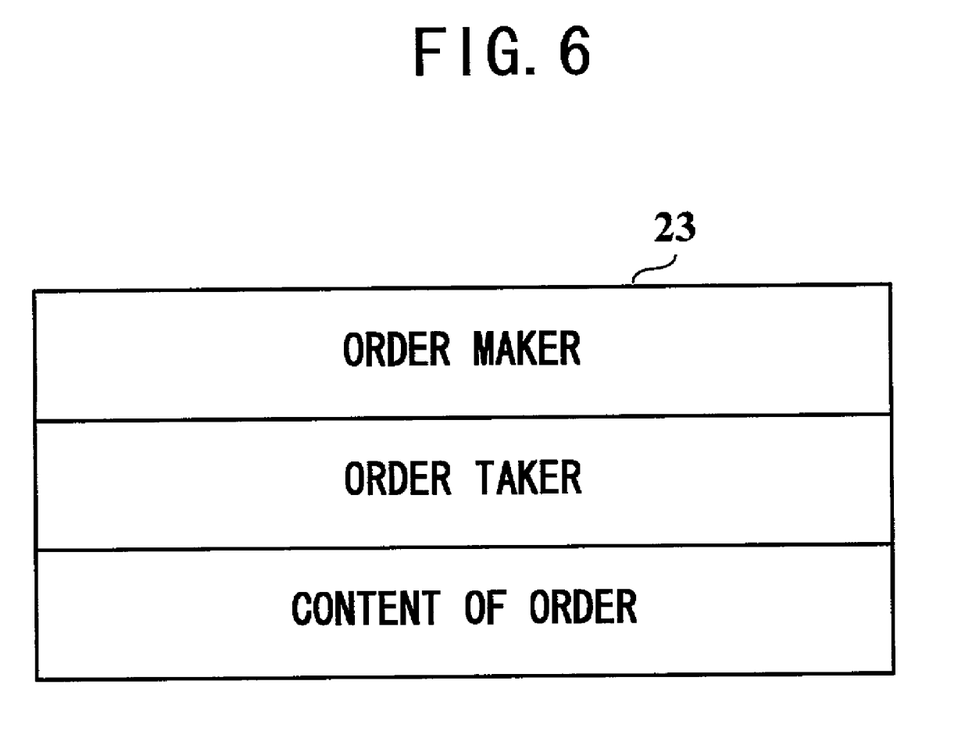
FIG. 6 is a diagram showing one example of second order data.

The customer database 6 shown in FIG. 6 stores customer data 21 in order to register a customer as a member of a service which is provided by the server 4. The customer data 21 represents information on a customer who uses the customer terminal 3. FIG. 4 shows one example of the customer data 21. The customer data 21 shown in FIG. 4 includes data representing a customer's name, a customer ID, a password, a customer's contact address including an e-mail address, and a residence address. Additionally, the customer data 21 includes physical information representing a customer's physical profile and condition such as height, weight, blood pressure, blood sugar level, and the like. The customer database 6 may be set in the first service provider's terminal 1 or in the server 4.

The order database 7 shown in FIG. 1 stores first order data 22 and second order data 23. The order database 7 may be set in the server 4.

Figure 5:
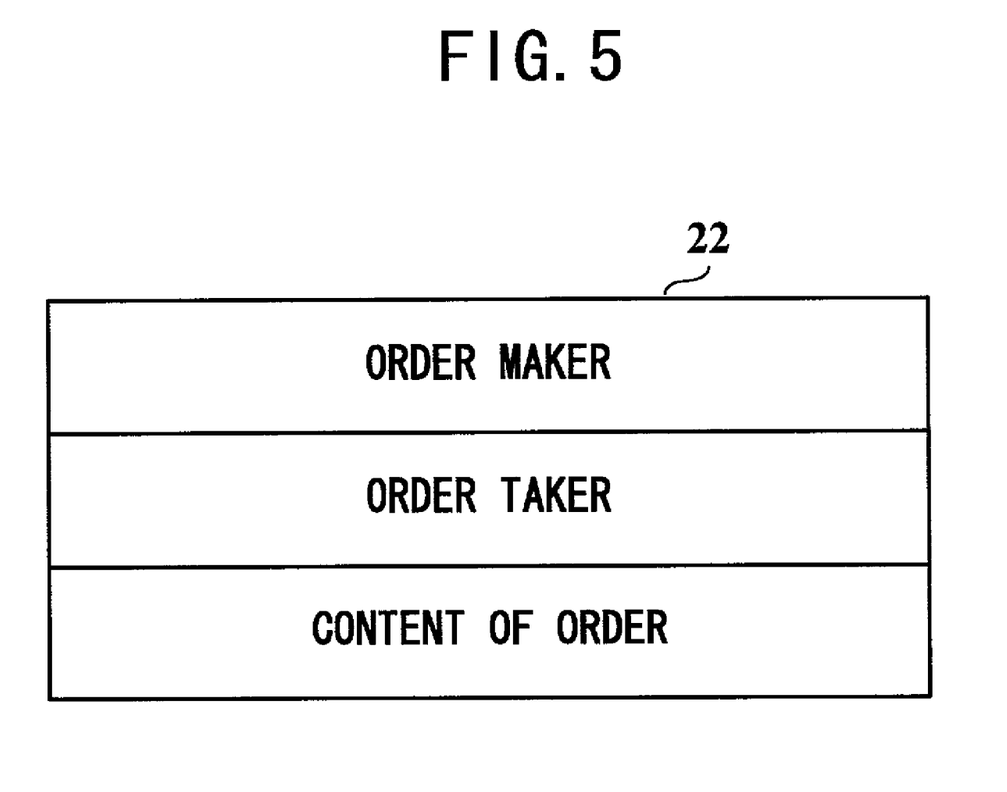
FIG. 5 is a diagram showing one example of first order data.

The first order data 22 represents a dish ordered by a customer from a cooking service provider. FIG. 5 shows one example of the first order data 22. The first order data 22 shown in FIG. 5 includes data representing an order maker, an order taker, and a content of an order. For example, the order maker in the first order data 22 represents a customer's name. The order taker in the first order data 22 represents a cooking service provider's name. The content of an order in the first order data 22 represents a name of a dish, a quantity, a price of the dish, and the like.

The second order data 23 represents a material of a dish ordered from a cooking material provider. FIG. 6 shows one example of the second order data 23. The second order data 23 shown in FIG. 6 includes data representing an order maker, an order taker, and a content of an order. For example, the order maker in the second order data 23 represents a customer's name, or a cooking service provider's name. The order taker in the second order data 23 represents a cooking material provider's name. The content of an order in the second order data 23 represents a name of a material, a quantity, and a price of the material.

The network 8 is a ordinary communication line including a LAN (Local Area Network), and the Internet.

An operation of the system according to this embodiment will now be explained.

Figure 7:
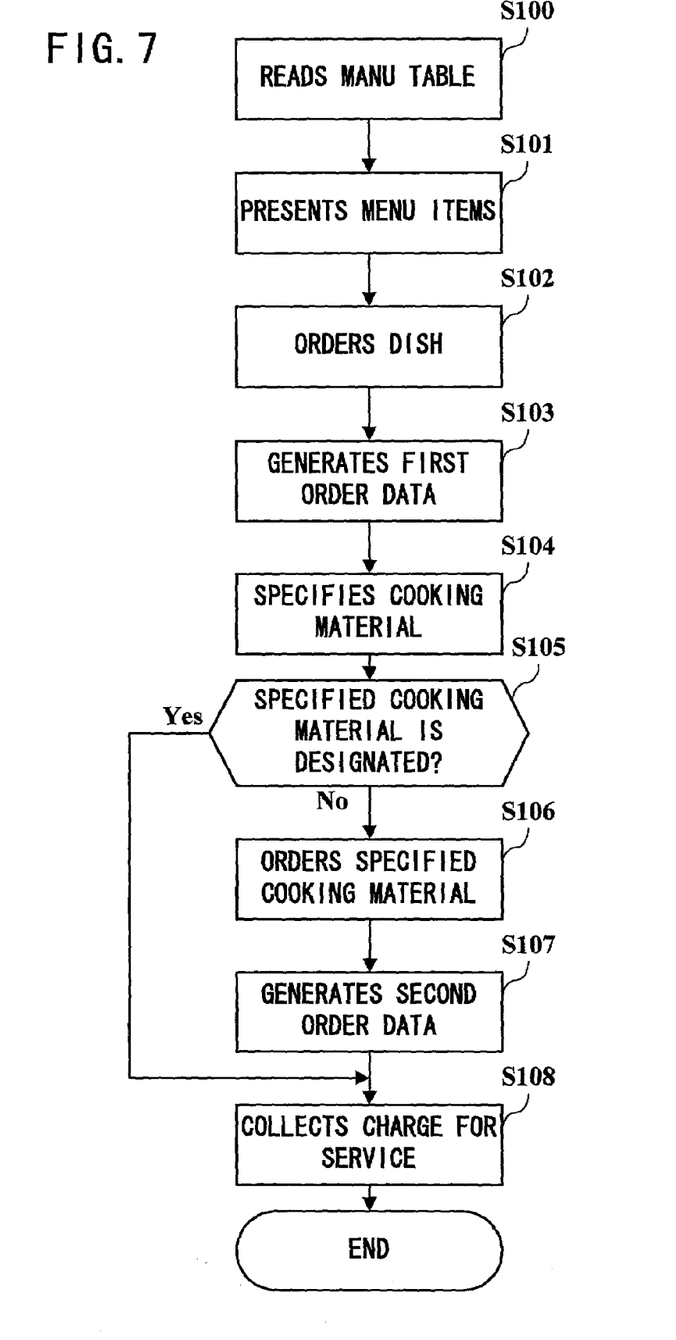
FIG. 7 is a flowchart showing a process performed when an order for a dish is made by a customer terminal.

FIG. 7 is a flowchart showing a process for ordering a dish from the customer terminal 3.

In this process, the customer terminal 3 sends a request for the menu table 16 to the server 4 in response to an operation of a customer.

In the server 4, the information providing unit 12 reads the menu table 16 in accordance with the request from the customer terminal 3 (step S100). The information providing unit 12 performs data communication with the customer terminal 3 in order to present menu items listed in the menu table 16 and nutritive values for the menu items to the customer. For example, information providing unit 12 generates a Web page in accordance with data read out from the menu table 16. The information providing unit 12 may determine the price for each menu items listed in the menu table 16 based on the cooking material data 20 stored in the cooking material database 5.

Then, in the customer terminal 3, for example, a browser controls a display device in accordance with data sent from the server 4. As a result, the menu items are presented to the customer together with their nutritive values via the customer terminal 3 (step S101). Each menu item presented to the customer is a dish prepared exclusively by each corresponding cooking service provider. The price of each menu item may be presented on the customer terminal 3 together with each menu item.

The customer terminal 3 generates an instruction representing a dish to order in accordance with an operation of the customer. The generated instruction is sent to the server 4. The server 4 performs data communication with the first service provider's terminal 1 so as to order the dish requested by the instruction sent from the customer terminal 3 from a cooking service provider (step S102). The customer terminal 3 may send the instruction representing a dish to order directly to the first service provider's terminal 1. When ordering dishes, the customer terminal 3 may designate a set of dishes as one menu, which is different from a menu for one meal previously set by a cooking service provider. In the server 4, the menu planning unit 11 determines prices of dishes included in the menu designated by the customer terminal 3 based on the cooking material data 20 stored in the cooking material database 5. The prices of dishes may be presented to the customer via the customer terminal 3 together with the menu for one meal.

In the server 4, the selection process unit 13 specifies a dish to be ordered from a cooking service provider in accordance with the instruction from the customer terminal 3. The order process unit 14 generates first order data 22 (step S103). The first order data 22 is to be stored in the order database 7. Further, the order process unit 14 searches the cooking material database 5 in order to specify a material necessary for making the dish (step S 104). At this time, the server 4 determines whether or not the specified material is a material designated by the cooking material designation unit 10 (step S105).

In a case where it is determined in step S105 that the specified material is not designated by the cooking material designation unit 10, the order process unit 14 performs data communication with the second service provider's terminal 2 so as to make an order for the specified material to a cooking material provider (step S106). And the order process unit 14 generates second order data 23 representing the content of the order made to the cooking material provider (step S107). The second order data 23 is to be stored in the order database 7. The order process unit 14 may perform data communication with the first service provider's terminal 1 in order to provide the cooking service provider with information regarding the specified material to order and the cooking material provider. In this case, the first service provider's terminal 1 may perform data communication with the second service provider's terminal in order to make an order for the material directly to the cooking material provider based on the information provided by the server 4. The order process unit 14 may send an e-mail including the second order data 23 to the cooking material provider.

In a case where it is determined in step S105 that the specified material is designated by the cooking material designation unit 10, the processes of steps S 106 and S 107 are skipped.

The monetary matter process unit 15 calculates charges for the services provided by the server 4 in response to registration of new first order data 22 or new second order data 23, or both of them into the order database 7. The monetary matter process unit 15 performs a process for collecting a charge from the cooking service provider indicated by the order taker of the first order data 22, or from the cooking material provider indicated by the order taker of the second order data 23 (step S108). For example, the monetary matter process unit 15 may collect the charges for the services by means of a credit card, a debit card, and the like. The monetary matter process unit 15 may charge to a bank account having a number input by the first service provider's terminal 1 or the second service provider's terminal 2.

In the example of the process shown in FIG. 7, the monetary matter process unit 15 starts performing the process for collecting service charges, in response to registration of the first order data 22 or the second order data 23 in the order database 7. However, the monetary matter process unit 15 may collect service charges at the time the cooking service provider and the cooking material provider are registered. And as another example, the monetary matter process unit 15 may perform a process for collecting service charges from cooking service providers and cooking material providers at regular intervals.

Figure 8:
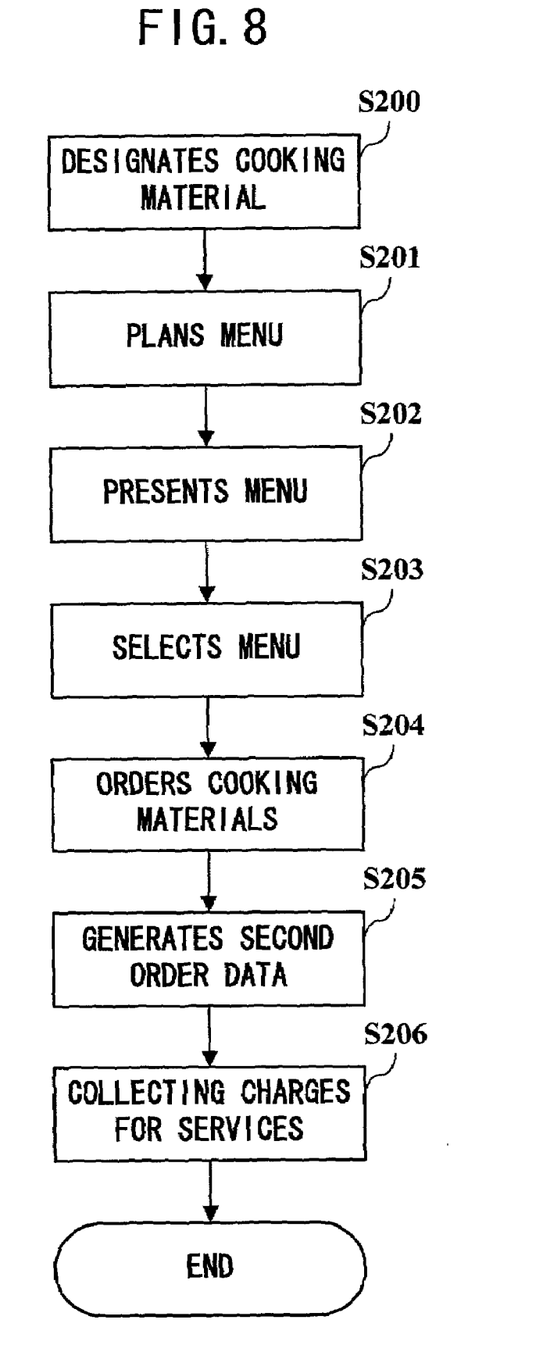
FIG. 8 is a flowchart showing a process performed when the server plans menu.

FIG. 8 is a flowchart showing a process performed when the server 4 plans a menu in accordance with an instruction from the customer terminal 3.

This process can be applied to a service in which a cooking material is delivered from a cooking material provider to a customer.

At the beginning of this process, the customer terminal 3 sends an instruction for designating a cooking material to the server 4 in accordance with an operation of a customer. For example, the customer terminal 3 enters information about a cooking material reserved at the customer's place, in a Web page created by the cooking material designation unit 10 of the server 4. The information entered from the customer terminal 3 is sent to the server 4. In another environment, the customer terminal 3 may send information read from a tag (a barcode or an IC chip) attached to a cooking material to the server 4. Or, in order to specify a cooking material which is reserved at the customer's place, the customer terminal 3 may perform image recognition based on image data acquired by taking a photo of the cooking material.

In the server 4, the cooking material designation unit 10 reads the information sent from the customer terminal 3, and designates the cooking material reserved at the customer's place (step S200).

The menu planning unit 11 plans a menu for one meal which includes the cooking material designated by the cooking material designation unit 10 (step S201). A process for planning a menu includes the following three sub steps. First, the menu planning unit 11 searches the cooking material database 5 in order to specify cooking material data 20 that corresponds to the cooking material designated by the cooking material designation unit 10. Second, the menu planning unit 11 retrieves information regarding a dish with which the cooking material data 20 is associated, from the cooking material database 5. Third, the menu planning unit 11 extracts a menu for one meal which includes the dish associated with the cooking material data 20, by referring to the menu table 16. In a case where there are a plurality of menus including the dish in the menu table 16, the menu planning unit 11 may extract all such menus.

The information providing unit 12 performs data communication with the customer terminal 3 in order to present the menu planned by the menu planning unit 11 to the customer (step S202). For example, the customer terminal 3 displays a Web page generated by the menu planning unit 11. The menu may be presented to the customer together with nutritive values and prices via the customer terminal 3. The selection process unit 13 formats the Web page to be provided to the customer terminal 3 so that selection of a menu can be made on the Web page.

In the same condition, the information providing unit 12 may provide the customer with information regarding a cooking material which is sold at a cooking material provider's shop near the customer's residence. A process for providing the information regarding a cooking material includes the following three sub steps, for example. First, the information providing unit 12 reads customer data 21 stored in the customer database 6 in order to specify the customer's address. Second, the information providing unit 12 reads cooking material data 20 stored in the cooking material database 5 in order to retrieve information regarding a cooking material sold at a cooking material provider's shop near the customer's residence. The information providing unit 12 may perform data communication with the second service provider's terminal 2 in order to retrieve latest information. Third, the information providing unit 12 performs data communication with the customer terminal 3 in order to provide the information regarding a cooking material. For example, information representing the price of the cooking material, the residence of the cooking material provider, and the like is provided to the customer via the customer terminal 3. A cooking material recommended by the cooking material provider, and a menu which can be made using the recommended cooking material may be provided to the customer via the customer terminal 3. Further, a cooking material sold at a discount, and a menu which can be made using the cooking material at a discount may be provided to the customer via the customer terminal 3. The information providing unit 12 may send an e-mail including the information regarding a cooking material to the customer. In this case, the e-mail address will be specified by the contact address included in the customer data 21.

The customer terminal 3 selects a menu by sending an instruction to the server 4 in accordance with an operation of the customer (step S203). In the server 4, the selection process unit 13 specifies the menu selected by the customer in accordance with the instruction from the customer terminal 3. The order process unit 14 performs a process for making orders for lacking materials to be used in dishes included in the menu specified by the selection process unit 13, to cooking material providers (step S204). The process for making orders for cooking materials to cooking material providers includes the following five sub steps, for example. First, the order process unit 14 extracts the menu specified by the selection process unit 13 while referring to the menu table 16. Second, the order process unit 14 searches the cooking material database 5 in order to specify cooking materials to be used in dishes included in the menu. Third, the order process unit 14 excludes the cooking material designated by the cooking material designation unit 10 from the cooking materials specified from the cooking material database 5. Fourth, the order process unit 14 reads cooking material data 20 in order to specify cooking material providers. The cooking material providers, from whom cooking materials are to be bought, are determined based on prices of the cooking materials, distances from the customer's residence, quantities of orders, and the like. Fifth, the order process unit 14 performs data communication with the second service provider's terminal 2 in order to order the cooking materials from the cooking material providers.

The order process unit 14 may perform data communication with the customer terminal 3 in order to provide the customer with information regarding cooking materials to be ordered, and cooking material providers. In this case, the customer terminal 3 may perform data communication with the second service provider's terminal 2 in order to order the cooking materials directly from the cooking material providers based on the information provided by the server 4. The order process unit 14 may determine cooking material providers from whom cooking materials are ordered in accordance with an instruction sent from the customer terminal 3.

When orders for the cooking materials are made, the order process unit 14 generates second order data 23 representing the contents of the orders to the cooking material providers (step S205). The second order data 23 is to be stored in the order database 7.

The monetary matter process unit 15 calculates a charge for the service provided by the server 4 in response to registration of new second order data 23 into the order database 7. The monetary matter process unit 15 performs a process for collecting charges from the cooking material providers represented by order takers written in the second order data 23 (step S206).

By following the same process shown in FIG. 8, the same server 4 may plan a menu in accordance with an instruction from the first service provider's terminal 1.

The system according to this embodiment of the present invention performs various other processes for supporting cooking.

For example, the server 4 may register a menu planned by the customer terminal 3 in the menu table 16. When registering a new menu in the menu table 16, the server 4 rewrites the cooking material database 5 in order to make changes in the associations between the information regarding dishes and the cooking material data 20. In addition, the monetary matter process unit 15 performs a process for paying a reward for the labor of planning the menu. For example, the monetary matter process unit 15 credits the reward to a bank account having a number which has been input from the customer terminal 3.

In the server 4, the schedule planning unit 17 may plan a dietary schedule based on the customer data 21 stored in the customer database 6 and information input from the customer terminal 3. A process for planning a schedule includes the following four sub steps. First, the customer terminal 3 inputs a target about the physical profile of the customer in accordance with an operation of the customer. For example, "losing weight by 10 Kg", "lowering the blood pressure by 20 mmHg", or the like may be presented as a target about the physical profile of the customer. The target input from the customer terminal 3 is notified to the server 4. Second, in the server 4, the schedule planning unit 17 reads the customer data 21 stored in the customer database 6. Third, the schedule planning unit 17 plans a schedule which indicates daily menus, based on the current physical profile of the customer represented by the physical information included in the customer data 21 and the target input from the customer terminal 3. Fourth, the schedule planning unit 17 performs data communication with the customer terminal 3 in order to provide the customer with the planned schedule.

The system of the present invention does not require a dedicated system, but can be realized on an ordinary computer network. For example, the system for performing the above described processes can be built up by installing a program for performing the above described processes to a computer which is connected to a network, from a recording medium (a magnetic recording medium, an optical recording medium, or the like) which stores the program. Further, the program for realizing the system of the present invention may be embedded as an order code in a carrier wave, to be sent to a computer.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-091161 filed on Mar. 27, 2001 and Japanese Patent Application No. 2001-094896 filed on Mar. 29, 2001 and including specification, claims, drawings and summary.

Japanese Patent Application No. 2001-091161 is directed to a system for providing menu preparation application service, its program and recording medium for offering a menu preparation application service enabling a user to prepare a menu and select the destination of ordering each food material at the time of ordering the food materials. An ASP service provider offers a menu preparation application to a client device of a user in cooperation with a food material selling store. An ASP server device is connected through the Internet to the client device and a selling store client device of the food material selling store which sells food materials. The server device prepares a menu in response to a request from the client device by referring to a food material information, and provides the candidates of the menu and the list of the information of the food materials necessary for the menu together with the price of food materials at each store selling the material. Then, the user orders the food materials necessary for the menu to the food material selling store.

Japanese Patent Application No. 2001-094896 is directed to a support system for providing food, system for providing application service for preparing menu, program, and recording medium capable of providing user-favorite food by a food providing company, and capable of supplying food materials for the food. The food providing company cooperates with an ASP service provider having an ASP server unit to supply a dish to order such as a lunch to a user. A menu preparing application is made to be used by a food provision supporting server unit in reference to a food material information DB, in the server unit. Information of the food materials as to a lunch company is stored in the DB, correlating the menu using the food materials with a food material distributing shop. The server has a WWW server, prepares the menu by using the menu preparing application when accessed from a WWW browser of a client device of the user via the Internet, receives an order by the server unit when ordered based on thereon, and orders the food materials to a client device for ordering the materials of the food material distributing shop connected by the Internet, based on the received food.

What is claimed is:

1. A computer system for supporting cooking, comprising:
   at least one customer terminal which is provided to at least one customer;
   at least one first service provider's terminal which is provided to at least one cooking service provider;
   at least one second service provider's terminal which is provided to at least one cooking material provider; and
   a server,
   wherein said server includes a providing unit which provides a plurality of menu items to the customer terminal;
   a selection unit which selects a menu item to order, from the menu items provided by said providing unit;
   a first order process unit which sends first order data to said first service provider's terminal for the menu item selected by said selection unit,
   a cooking material designation unit which designates at least one cooking material reserved at the cooking service provider's place;
   a specification process unit which specifies at least one cooking material to be used in the menu item selected by said selection unit;
   a determination process unit which determines whether or not the cooking material specified by said specification process unit is the material designated by said cooking material designation unit and
   a second order process unit which sends second order data to said second service provider's terminal for the cooking material specified by said specification process unit in case where said determination process unit determines that the cooking material is not designated by said cooking material designation unit.

2. The system according to claim 1, wherein said providing unit provides menu items which have been planned by at least one cooking service provider.

3. The system according to claim 2, wherein said selection unit is set so that a menu for one meal which is different from a menu for one meal which has been set by at least one cooking service provider can be selected.

4. The system according to claim 1, wherein said providing unit presents a price and a nutritive value for each menu item.

5. The system according to claim 1, further comprising a monetary matter process unit which collects a charge for a service for ordering the menu item.

6. A server for supporting cooking, comprising:
   a providing unit which performs data communication with at least one customer terminal in order to provide at least one customer with a plurality of menu items;

a selection unit which selects a menu item to order in accordance with instruction sent from said customer terminal;

a first order process unit which performs data communication with at least one first service provider's terminal used by at least one cooking service provider, in order to send at least one order to the cooking service provider for the menu item selected by said selection unit;

a cooking material designation unit which designates at least one cooking material reserved at the cooking service provider's place;

a specification process unit which specifies at least one cooking material to be used in the menu item selected by said selection unit;

a determination process unit which determines whether or not the cooking material specified by said specification process unit is the material designated by said cooking material designation unit and a second order process unit which performs data communication with at least one second service provider's terminal used by at least one cooking material provider, in order to send at least one order to the cooking material provider for the cooking material specified by said specification process unit in case where said determination process unit determines that the cooking material is not designated by said cooking material designation unit.

* * * * *